US011379817B1

(12) United States Patent
Bandi et al.

(10) Patent No.: US 11,379,817 B1
(45) Date of Patent: Jul. 5, 2022

(54) SMART TOLL APPLICATION DETERMINING FOR VARIOUS TOLL APPLICATIONS USING V2X COMMUNICATIONS

(71) Applicant: FORD GLOBAL TECHNOLOGIES, LLC, Dearborn, MI (US)

(72) Inventors: Krishna Bandi, Farmington Hills, MI (US); Sathyanarayana Chary Palakonda, Northville, MI (US); Samer Ibrahim, Dearborn, MI (US); Brennan Hamilton, Birmingham, MI (US); Jovan Milivoje Zagajac, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/158,251

(22) Filed: Jan. 26, 2021

(51) Int. Cl.
*G06Q 20/32* (2012.01)
*G06Q 20/06* (2012.01)
*G06Q 30/02* (2012.01)
*G07B 15/06* (2011.01)

(52) U.S. Cl.
CPC ......... *G06Q 20/32* (2013.01); *G06Q 30/0283* (2013.01); *G07B 15/063* (2013.01); *G06Q 2240/00* (2013.01)

(58) Field of Classification Search
CPC .................................................... G06Q 20/32
See application file for complete search history.

(56) References Cited

U.S. PATENT DOCUMENTS

| 6,556,916 | B2 | 4/2003 | Waite et al. |
| 7,224,291 | B2 | 5/2007 | Hassett |
| 2009/0295599 | A1* | 12/2009 | Coffee ................. G07B 15/063 340/928 |
| 2014/0257686 | A1 | 9/2014 | Feldman et al. |
| 2016/0171787 | A1 | 6/2016 | Yohalashet |
| 2021/0056853 | A1* | 2/2021 | Caldwell .............. G05D 1/0221 |
| 2021/0180979 | A1* | 6/2021 | Kitahara ............ G01C 21/3811 |
| 2021/0199463 | A1* | 7/2021 | Kitahara ............ G01C 21/3815 |
| 2021/0334552 | A1* | 10/2021 | Li ............................ G06T 7/80 |

* cited by examiner

*Primary Examiner* — Joseph H Feild
*Assistant Examiner* — Pameshanand Mahase
(74) *Attorney, Agent, or Firm* — Michael J. Spenner; Brooks Kushman P.C.

(57) ABSTRACT

A toll advertisement message (TAM) broadcast from a roadside unit (RSU) is received by a vehicle via V2X communication, the TAM indicating geographic locations of lanes of a roadway for which tolls are due and cost information for traversing the lanes of the roadway. A heading of the vehicle is determined in relation to a TAM reference point indicating a geographic location of a toll gantry. A toll zone boundary region for the vehicle is identified by filtering the geographic locations of the lanes in the TAM to include only those lanes in a travel direction consistent with the heading. A lane straddling algorithm is utilized to identify, for each of the lanes in the travel direction, a respective percentage within each lane that the vehicle is traveling. A tolling usage message (TUM) is sent via the V2X communication, indicating to the RSU the percentage lane usage of the vehicle.

28 Claims, 15 Drawing Sheets

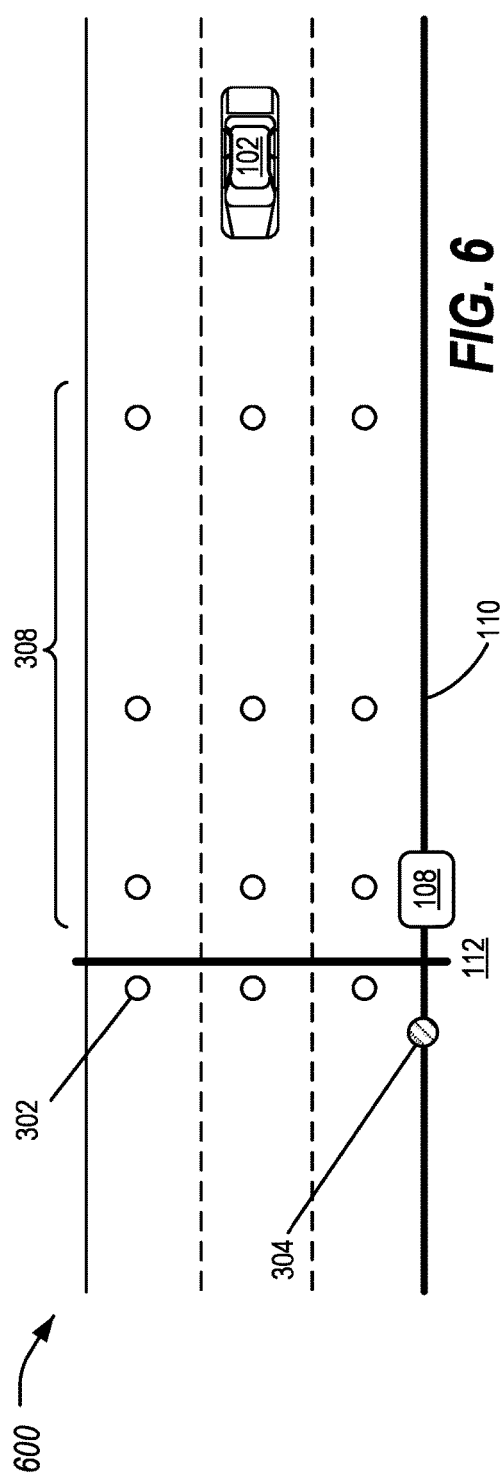
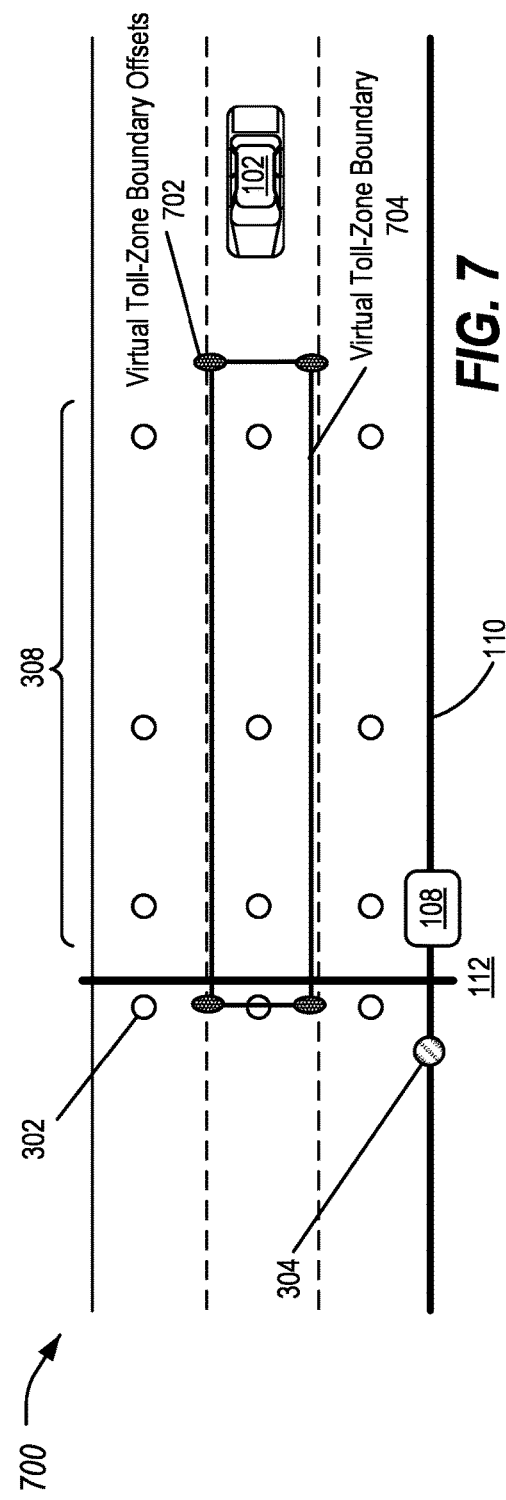

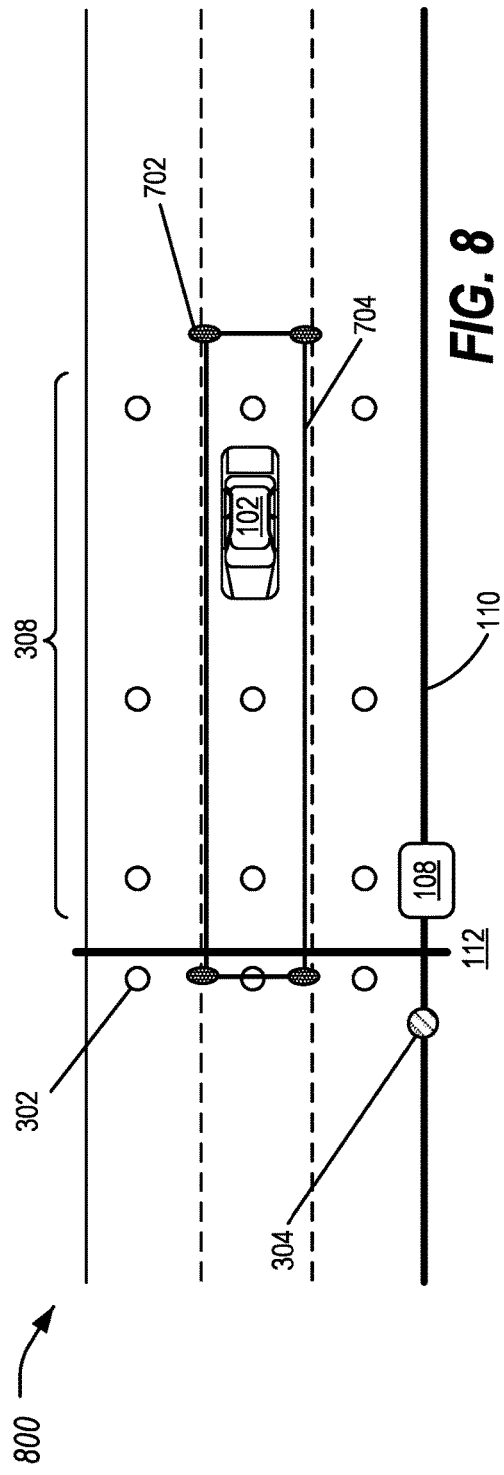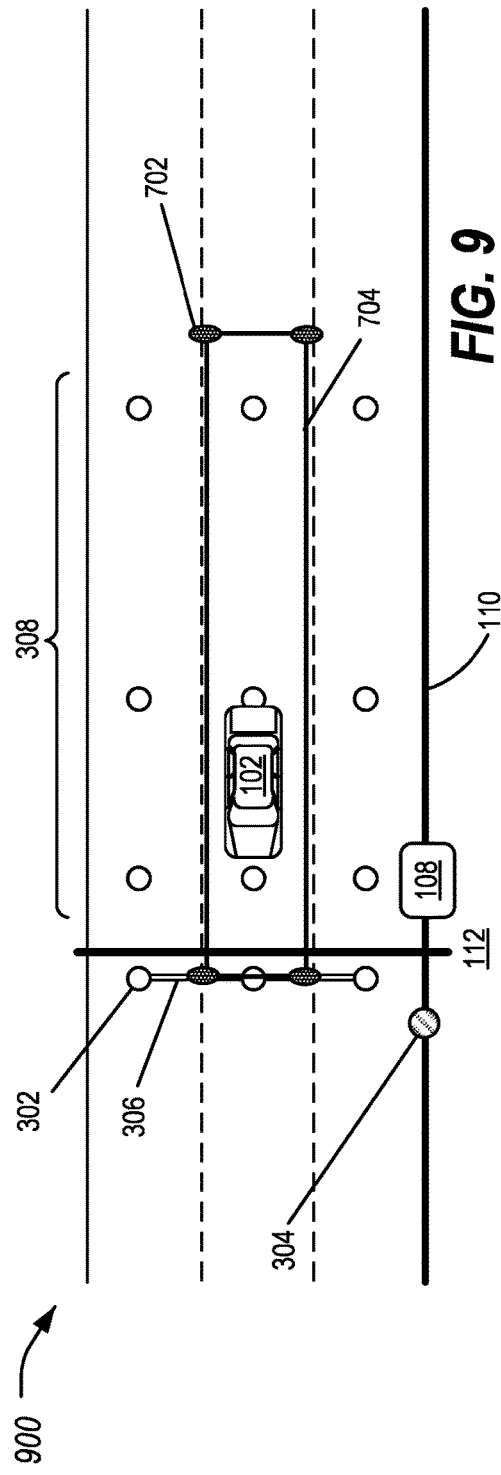

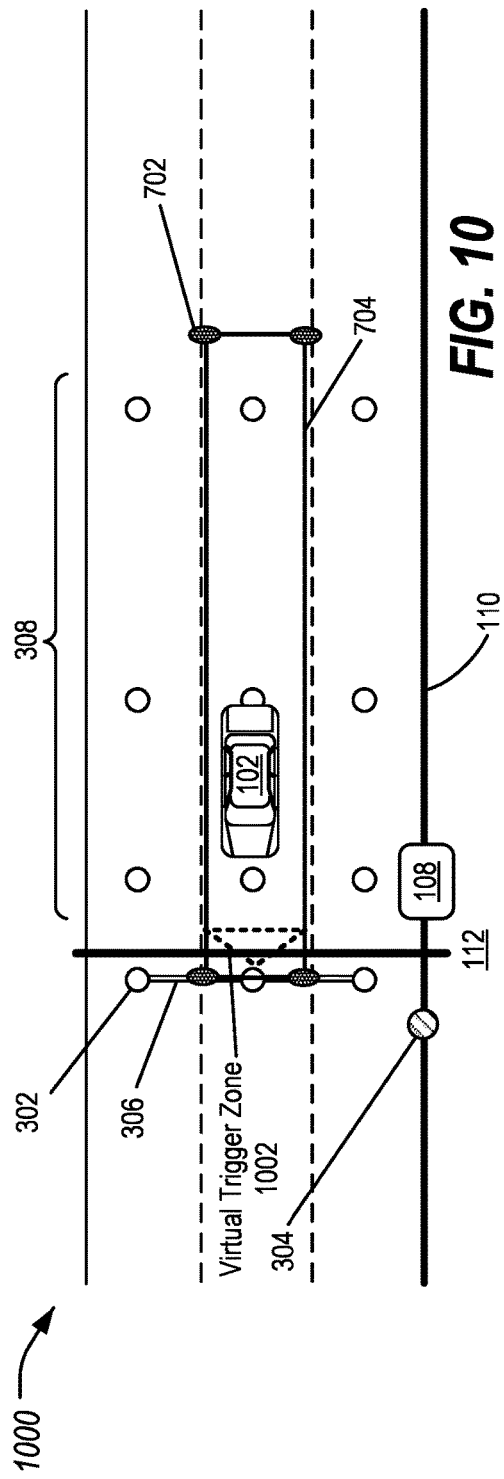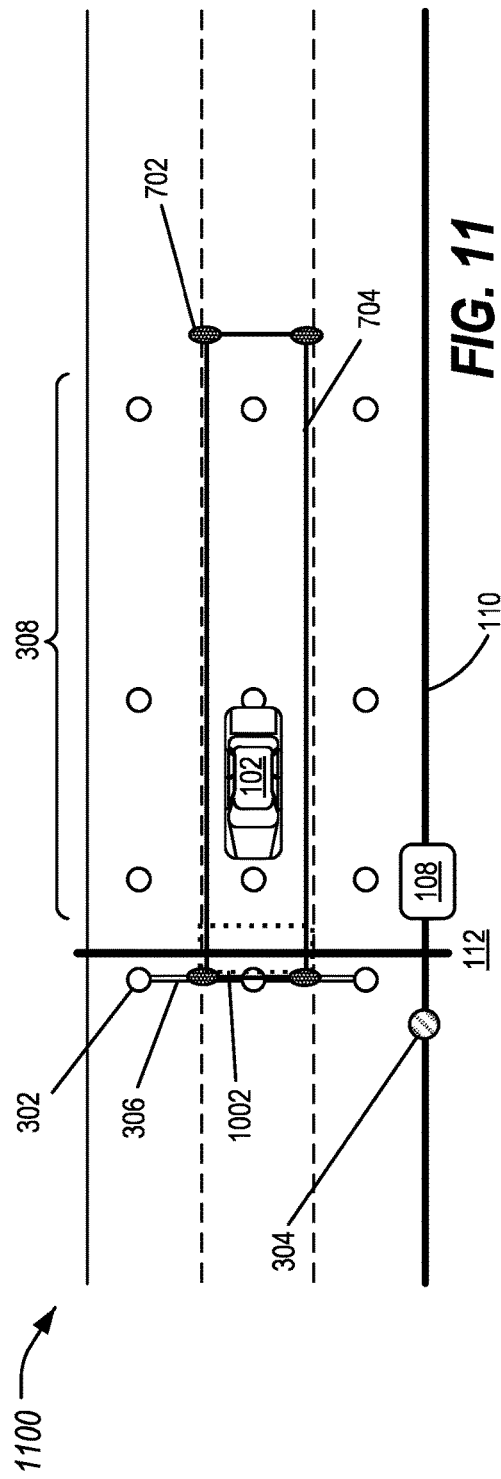

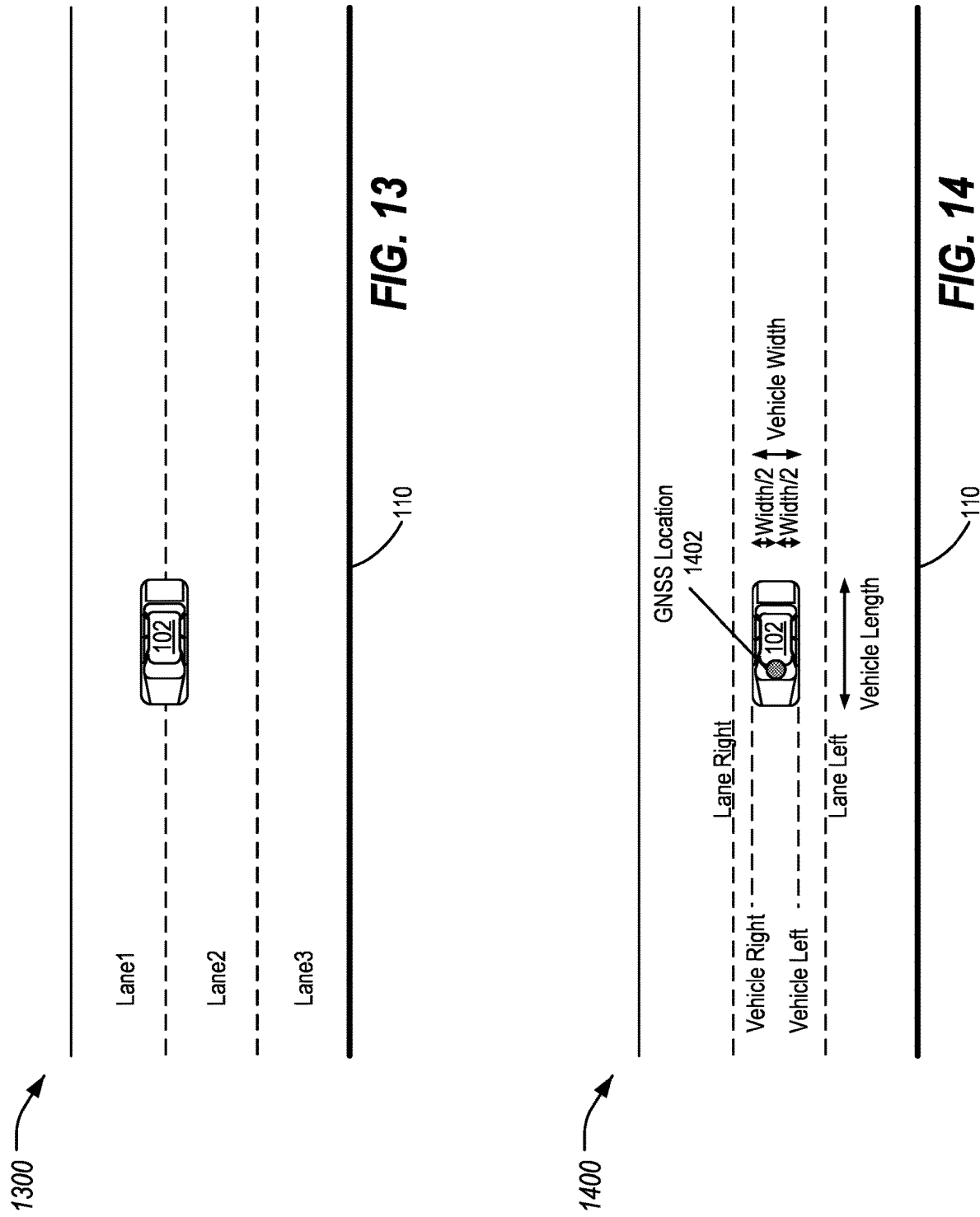

SMART TOLL APPLICATION DETERMINING FOR VARIOUS TOLL APPLICATIONS USING V2X COMMUNICATIONS

TECHNICAL FIELD

Aspects of the present disclosure generally relate to smart toll application determining for various toll applications using vehicle-to-everything (V2X) communications.

BACKGROUND

V2X Tolling may refer to electronic fee collection (EFC) toll charging supported by electronic equipment on-board of a vehicle configured for V2X communication. These V2X communications may include the exchange of information between various infrastructure elements.

SUMMARY

In one or more illustrative examples, a vehicle for smart tolling is provided. The vehicle includes a telematics control unit configured to provide vehicle-to-everything (V2X) communication and a processor. The processor is programmed to receive a toll advertisement message (TAM) broadcast from a roadside unit (RSU) via V2X communication, the TAM indicating geographic locations of lanes of a roadway for which tolls are due and cost information for traversing the lanes of the roadway. The processor is further programmed to determine a heading of the vehicle in relation to a TAM reference point indicating a geographic location of a toll gantry, and identify a toll zone boundary region for the vehicle by filtering the geographic locations of the lanes in the TAM to include only those lanes in a travel direction consistent with the heading. The processor is further programmed to utilize a lane straddling algorithm to identify, for each of the lanes in the travel direction, a respective percentage within each lane that the vehicle is traveling, and send a tolling usage message (TUM) via the V2X communication, the TUM indicating, to the RSU, the percentage lane usage of the vehicle.

In one or more illustrative examples, a method for smart tolling is provided. A toll advertisement message (TAM) broadcast from a roadside unit (RSU) is received by a vehicle via V2X communication, the TAM indicating geographic locations of lanes of a roadway for which tolls are due and cost information for traversing the lanes of the roadway. A heading of the vehicle is determined in relation to a TAM reference point indicating a geographic location of a toll gantry. A toll zone boundary region for the vehicle is identified by filtering the geographic locations of the lanes in the TAM to include only those lanes in a travel direction consistent with the heading. A lane straddling algorithm is utilized to identify, for each of the lanes in the travel direction, a respective percentage within each lane that the vehicle is traveling. A tolling usage message (TUM) is sent via the V2X communication, the TUM indicating, to the RSU, the percentage lane usage of the vehicle.

BRIEF DESCRIPTION OF THE DRAWINGS

FIG. 6 illustrates an example of a vehicle entering into proximity of the gantry;

FIG. 7 illustrates an example of determining toll-zone boundary offsets for a lane of the vehicle;

FIG. 8 illustrates an example of continued travel of the vehicle into the virtual toll-zone boundary in view of the lane node offsets and the virtual toll-zone boundary offsets.

FIG. 9 illustrates an example vehicle approach towards the toll trigger line;

FIG. 10 illustrates an example virtual trigger zone for the broadcasting of a toll usage message by the vehicle;

FIG. 11 illustrates an alternate example virtual trigger zone for the broadcasting of a toll usage message by the vehicle;

FIG. 13 illustrates an example of a vehicle straddling two lanes;

FIG. 14 illustrates an example of various measurements for the determination of the vehicle straddling;

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

Many electronic tolling systems using radio frequency identifier (RFID) and gantry-based technology platforms. Due to limitations in the data that may be transferred in current systems, there may be situations in which existing systems cannot properly detect and charge a passing vehicle due to conditions such as an obstructed license plate, an attached trailer, a vehicle straddling lanes, etc. For example, positioning of cameras on the gantry can limit the cameras from making more intelligent decisions. These decisions may include, as some examples: (i) proper lane tracking/ identification by the vehicle; (ii) range of communication for vehicle maneuvering; (iii) identification of complex toll road geometries and topologies; (iv) precise determination of the vehicle within the lane; (v) communication of a toll usage message for the vehicle including reliably to the toll gantry system and precisely to the toll gantry system; (vi) determination of lane straddling of a vehicle for tolling (for example, open toll roads etc.) scenarios; and (vii) conveying information to the vehicle HMI regarding the toll-information being charged.

Moreover, existing systems may be incapable of providing rich data to support in-vehicle technologies to provide for an improved user experience. These in-vehicle technologies may include (i) real time information/notifications/alerts about the toll-usage-rates/toll-charged-rates in comfortable advance to the vehicle-customer approaching/exiting towards the toll zone; (ii) in-vehicle human-machine interface (HMI) information to the vehicle customer; and (iii) sharing and/or broadcasting vehicle usage information for the toll-road to toll authority agencies for smart, easy, and secure transactions.

Figure 1:
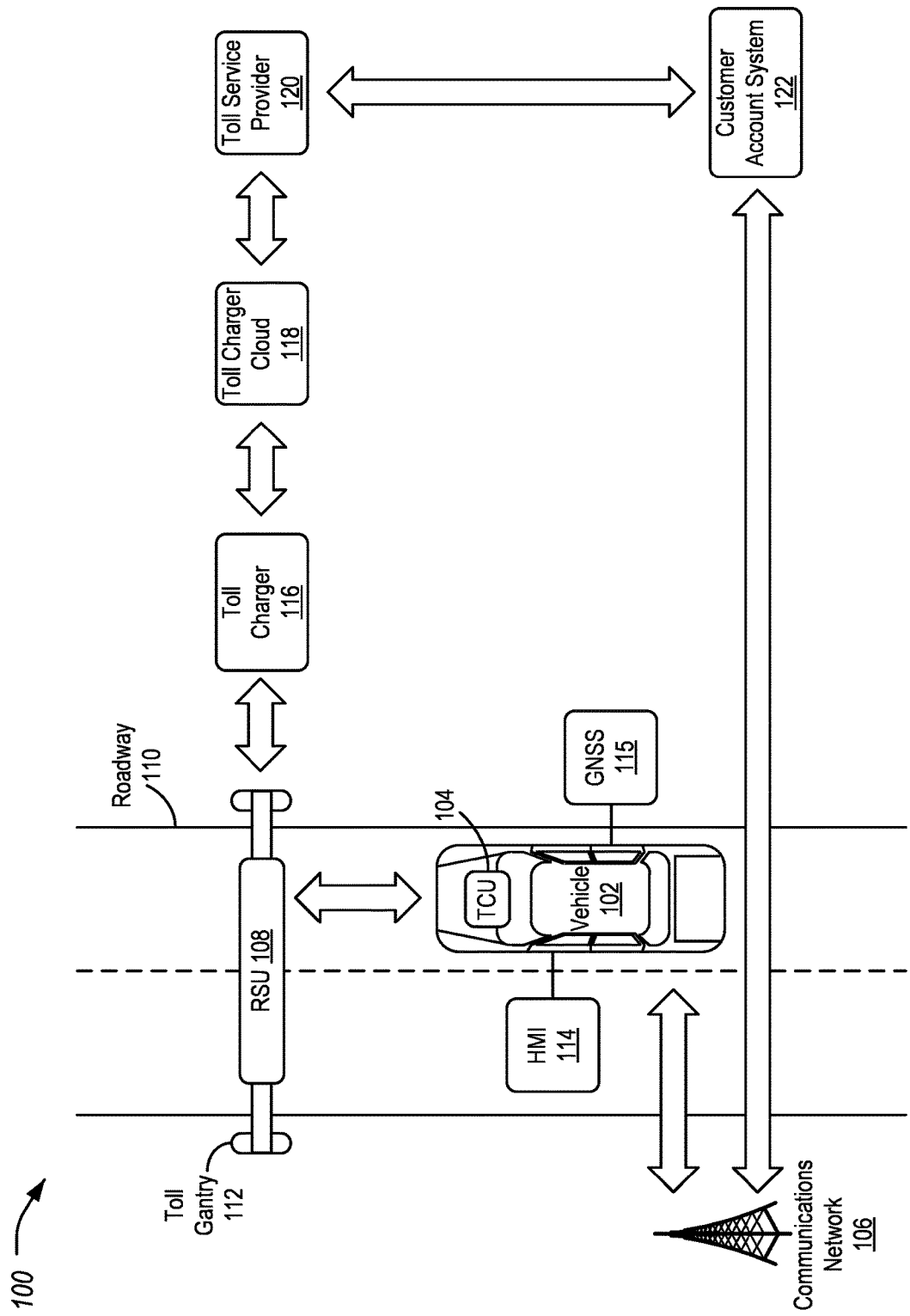
FIG. 1 illustrates an example system for the performance of V2X tolling transactions.

FIG. 1 illustrates an example system 100 for the performance of V2X tolling transactions. As shown, the system 100 includes a wireless-enabled vehicle 102 configured to travel along a roadway 110. The vehicle 102 includes a telematics control unit (TCU) 104 and an HMI 114. The system 100 also includes a toll gantry 112 or other toll installation that includes a road-side unit (RSU) 108. The RSU 108 communicates with a toll charger 116 over a secure channel (such as a wired connection), which in turn communicates with a toll pay center 118. The toll pay center 118 also communicates with a toll agency hub 120 and a customer account system 122. Using the TCU 104, the vehicle 102 communicates with the RSU 108 over a broadcast peer-to-peer protocol (such as PC5), and with a communications network 106 over a network protocol, which allows the vehicle 102 to communicate with the customer account system 122, for example. It should be noted that the system 100 shown in FIG. 1 is merely an example, and systems having more, fewer, and different arrangements of elements may be used. For instance, one or more of the RSU 108, toll charger 116, toll pay center 118, and toll agency hub 120 may be combined into a single device. Moreover, while only one vehicle 102 along one roadway 110 is shown, it is contemplated that systems 100 would include many vehicles 102 and roadways 110 to traverse.

The vehicles 102 may include various other types of passenger vehicles, such as sedans, crossover utility vehicles (CUVs), vans, sport utility vehicles (SUVs), trucks, recreational vehicles (RVs), scooters, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The TCU 104 may be configured to provide telematics services to the vehicle 102. These services may include, as some non-limiting possibilities, navigation, turn-by-turn directions, vehicle health reports, local business search, accident reporting, and hands-free calling. The TCU 104 may accordingly be configured to communicate over various protocols, such as with a communication network 106 over a network protocol (such as Uu). The TCU 104 may, additionally, be configured to communicate over a broadcast peer-to-peer protocol (such as PC5), to facilitate C-V2X communications with devices such as the RSU 108. It should be noted that these protocols are merely examples, and different peer-to-peer and/or cellular technologies may be used.

The communications network 106 may provide communications services, such as packet-switched network services (e.g., Internet access, voice over Internet Protocol (VoIP) communication services), to devices connected to the communications network 106. An example of a communications network 106 is a cellular telephone network. For instance, the TCU 104 may access the cellular network via connection to one or more cellular towers. To facilitate the communications over the communications network 106, the TCU 104 may be associated with unique device identifiers (e.g., mobile device numbers (MDNs), Internet protocol (IP) addresses, etc.) to identify the communications of the TCU 104 on the communications network 106 as being associated with the vehicle 102.

The RSU 108 may be a device with processing capabilities and networking capabilities, and may be designed to be placed in proximity of a roadway 110 for use in communicating with vehicles 102. In an example, the RSU 108 may include hardware configured to communicate over the broadcast peer-to-peer protocol (such as PC5), to facilitate C-V2X communications with the vehicles 102. The RSU 108 may also have wired or wireless backhaul capability to allow for communication with other elements of the communications network 106, such as the toll charger 116.

The toll gantry 112 may be framework installed across the roadway 110. The toll gantry 112 may serve as a location to mount hardware to give the hardware a clear view of the roadway 110. In an example, the RSU 108 may be mounted to the toll gantry 112. It should be noted that, in other examples, the RSU 108 may be located along the ground adjacent to the roadway 110 and the toll gantry 112 may be omitted.

The HMI 114 may include various output devices configured to provide information to users, as well as input devices configured to receive information from users. Output devices may include, as some examples, display screens, touch screens, projectors, lights, speakers, buzzers, and haptic feedback sensors. Input devices may include, as some examples, touch screens, keyboards, buttons, knobs, and microphones, as some possibilities.

A global navigation satellite system (GNSS) 115 controller may be utilized by the vehicle 102 to provide autonomous geo-spatial positioning for the vehicle 102. As some examples, the GNSS 115 controller may allow the vehicle 102 to determine its position using one or more satellite navigation systems, such as GPS, GLONASS, Galileo, Beidou and/or others.

The toll charger 116 is a networked computing device configured to perform operations in support of the functionality of the RSU 108. In an example, the toll charger 116 may be in communication with the RSU 108 and may be programmed to operate as a gateway between the RSU 108 and the toll pay center 118. The toll charger 116 may be responsible for managing operations between the broadcast nature of the RSU 108 operations and the remainder of the system 100. These operations may include, for example, verification of messages received from vehicles 102 by the RSU 108, certificate verification and identification, and communication with the toll pay center 118 to perform further operations over a secure line. In many examples, each RSU 108 may be supported by its own corresponding toll charger 116. However, in other examples, a single toll charger 116 may be configured to handle multiple RSUs 108, such as a set of RSUs 108 covering operation of the roadway 110.

The toll pay center 118 is a networked computing device also configured to perform operations in support of the functionality of the system 100. In an example, the toll pay center 118 may be programmed to perform operations in support of the payment aspects for use of the roadway 110 by the vehicle 102. In some examples, the system 100 may include different toll pay centers 118, where each toll pay center 118 is configured to handle payments for those vehicles 102 having accounts with the toll pay center 118. As one possibility, different vehicle 102 manufacturers may each maintain their own toll pay center 118. As another possibility, vehicles 102 may subscribe to the use of various third-party toll pay centers 118.

The toll agency hub 120 is a networked computing device also configured to perform operations in support of the functionality of the system 100. The toll agency hub 120 may be configured to perform operations such as providing cost information to the various toll pay centers 118 with respect to the costs for usage of the roadway 110. For instance, the toll agency hub 120 may provide a toll schedule indicative of the costs of traversing the roadway 110, including costs for usage of different lanes (e.g., express, carpool, regular, etc.), usage for different classes of vehicles 102 (e.g., passenger cars, semi-trucks, etc.), usage for different times of day, and usage for high traffic vs low traffic situations. The toll agency hub 120 may also be configured to perform payment reconciliation operations, reporting functions, and may also provide information regarding vehicles 102 that are observed on the roadway 110 that may not have paid (e.g., as identified according to wireless transmissions of basic safety messages (BSMs), pictures from cameras, etc.).

The customer account system 122 is a networked computing device also configured to perform operations in support of the functionality of the system 100. Using the customer account system 122 a user may set up a payment account, be charged by the toll charger 116 for use of the roadway 110, and request and receive toll receipts with respect to usage of the roadway 110. Such payment transactions require the exchange of PI with toll authorities over the air.

Tolling operations may be performed using the elements of the system 100. For instance, the toll agency hub 120 may send a toll rate schedule to the toll charger server 116. This toll rate table may include information that may be used to allow a vehicle 102 to understand the charges that may be incurred to traverse the roadway 110. In a simple example, the toll rate schedule may indicate that the cost to traverse the roadway 110 is a fixed amount. However, in many examples, the cost to traverse the roadway 110 may vary according to various factors. For instance, travel in a first lane may incur a first charge, while travel in another lane may incur a second, different, charge. In another example, the cost may vary based on the number of occupants of the vehicle 102. In yet a further example, the cost may vary based on the type of vehicle 102 (e.g., a semitruck may incur a greater charge than a passenger car). In an even further example, costs may vary based on other factors, such as amount of traffic, time of day, day of week, and/or weather.

The toll charger server 116 may update rate details of toll advertisement message (TAM). In an example, the toll charger server 116 receives the toll rate schedule, identifies current rates, and updates rate information at the toll charger server 116. This rate information may be cached at the toll charger server 116 and sent to the RSU 108. The RSU 108 may broadcast the rate information as well as other information in a TAM message. This broadcast may be a periodic broadcast, such as a rebroadcast of the TAM every 100 milliseconds.

The TAM may include various information that may be useful for vehicles 102 in understanding usage of the roadway 110. This may include fields such as: a timestamp indicative of the time at which the TAM was created or sent, toll types and toll amounts indicative of how the toll information is charged (e.g., based on the toll rate table), a layer type, a layer identifier, an identifier of the toll charger server 116, and an identifier of the toll pay center 118. The layer type may be a data element used to uniquely identify a type of information to be found in a layer of a geographic map fragment such as an intersection. The layer identifier may correspondingly be an identifier of map information. The identifier may be a globally-unique identifiers (GUID), to allow the toll pay centers 118 to be uniquely identified by the system 100.

The TAM may also include map information indicative of the layout of the roadway 110, such as an intersection geometry list and a road segment list. The road segment list include various properties of the roadway, including lane description, high occupancy status, and so on. This information may include, for instance, indications of the layout of the lanes of the roadway 110, which may be used to allow vehicles 102 to identify when a tolled area is approached, as well as in which lane the vehicle 102 is traveling. Further aspects of map data and other details of message elements described herein are further defined in the J2735 standard Dedicated Short Range Communications (DSRC) Message Set Dictionary™, published by SAE International, the standard being incorporated herein by reference in its entirety.

The TAM 600 may also include other information such as a list of data parameters 620. This may include, for instance, other information that may be relevant for tolling that does not fit into the other categories of information, such as special instructions for use of the toll roadway 110. The TAM message 600 may also include a restrictions list 622, which may include information regarding limits to access to the roadway 110, such as weight limits, or restrictions against certain classes of vehicles 102 (e.g., no semitrucks allowed).

The TCU 104 of the vehicle 102 may receive the TAM broadcast by the RSU 108. The vehicle 102 may logs entry into the roadway 110. For instance, responsive to the geographic coordinates of the vehicle 102 matching one of the lanes of the roadway 110, the TCU 104 may identify that the vehicle 102 is entering a specific lane of the roadway 110. Knowing the lane of entry, the TCU 104 may then calculate the charge to be incurred by the vehicle 102. The TCU 104 may also generate a toll usage message (TUM).

The TUM includes various information provided by vehicles 102 to RSUs 108 that indicates usage of the roadway 110 by the vehicle 102. This information may include fields such as a message count that indicates a unique number of the TUM for the transaction. The message count may be used to help in identifying if any packet loss has occurred. The TUM may also include a unique random identifier that may be used as a temporary account identifier to track the transaction of messaging between the vehicle 102 and the broadcast message interface of the RSU 108, while preserving relative anonymity of the vehicle 102.

The TUM may also include information about the vehicle 102 entry to the toll area. For instance, the TUM may include a timestamp the time when the TUM was created, latitude, longitude, and elevation of the vehicle 102, positional accuracy of the latitude, longitude, and elevation, speed of the vehicle 102, and heading of the vehicle 102. The TUM may also include other information, such as type of the vehicle 102, an identifier of the toll charger server 116, and an identifier of the toll pay center 118. The identifiers may be GUIDs, to allow the toll charger servers 116 and toll pay centers 118 to be uniquely identified. The TUM may also include an intersection identifier of the intersection through which the vehicle 102 entered the roadway 110, where the intersection identifier was received by the vehicle 102 in the TAM (e.g., via the intersection geometry list and/or road segment list). The TUM may also include a charge amount for the travel in the tolled area as determined by the vehicle 102 using the information in the TAM. Other information may also be included in the TUM, such as the distance traveled 830 by the vehicle 102, a number of passengers in the vehicle 102, and a license plate number or other identifier of the vehicle 102.

The TCU 104 may update the HMI 114 to cause the HMI 114 to display a message indicating that the vehicle 102 entered the toll zone. The HMI 114 may further indicate that the vehicle 102 will be charged the amount indicated for the lane that the vehicle 102 is in.

The TCU 104 may send the TUM to the RSU 108. In one example, the TUM may be encoded with a key and/or signed using a certificate, and the RSU 108 may utilize a key or other information to decrypt and/or confirm the sender of the TUM as being the TCU 104. The RSU 108 may forward the TUM to the toll charger server 116. The toll charger server 116 may forwards the TUM to the toll pay center 118 corresponding to the vehicle 102. The toll pay center 118 may verify the vehicle 102 account with the customer account system 122 and complete the transaction. The pay center 118 may accordingly generates a toll receipt message (TRM) to be returned to the vehicle 102.

In some examples, the vehicle 102 broadcasting the TUM may create an blockchain record of the TUM enforced as a smart contract. The RSU 108 may operate as a transaction database from the TUM information broadcast by the vehicle 102 through exchange of the smart contract. A transaction database at the RSU 108 may update a distributed block chain ledger of received TUMs for tolling enforcement at the RSU 108 and gantry 112.

The TRM may include various information determined by the toll pay center 118 in support of completion of the toll transaction performed with the vehicle 102. This information may include a message count (to help in identifying if any packet loss has occurred), the account identifier from the TUM, the timestamp the time when the TUM was created, an identifier of the toll charger server 116, and an identifier of the toll pay center 118 (e.g., a GUID). The TRM may also include an intersection identifier of the intersection through which the vehicle 102 entered the roadway 110 (e.g., as indicated in the TUM that was processed by the toll pay center 118), a lane identifier of which lane through which the vehicle 102 entered the roadway 110 (e.g., as indicated in the TUM that was processed by the toll pay center 118), an intersection identifier of the intersection through which the vehicle 102 exited the roadway 110, and a lane identifier of which lane through which the vehicle 102 exited the roadway 110. The TRM may also include the vehicle type and the amount charged for access to the roadway 110.

The toll pay center 118 may forward the TRM to the toll charger server 116. In turn, the toll charger server 116 may forward the TRM back to the RSU 108. The RSU 108 may broadcast the TRM, which may be received by the TCU 104 of the vehicle 102. The TCU 104 may update the HMI 114 to display a message indicating completion of the process and the final charged amount.

Figure 2:
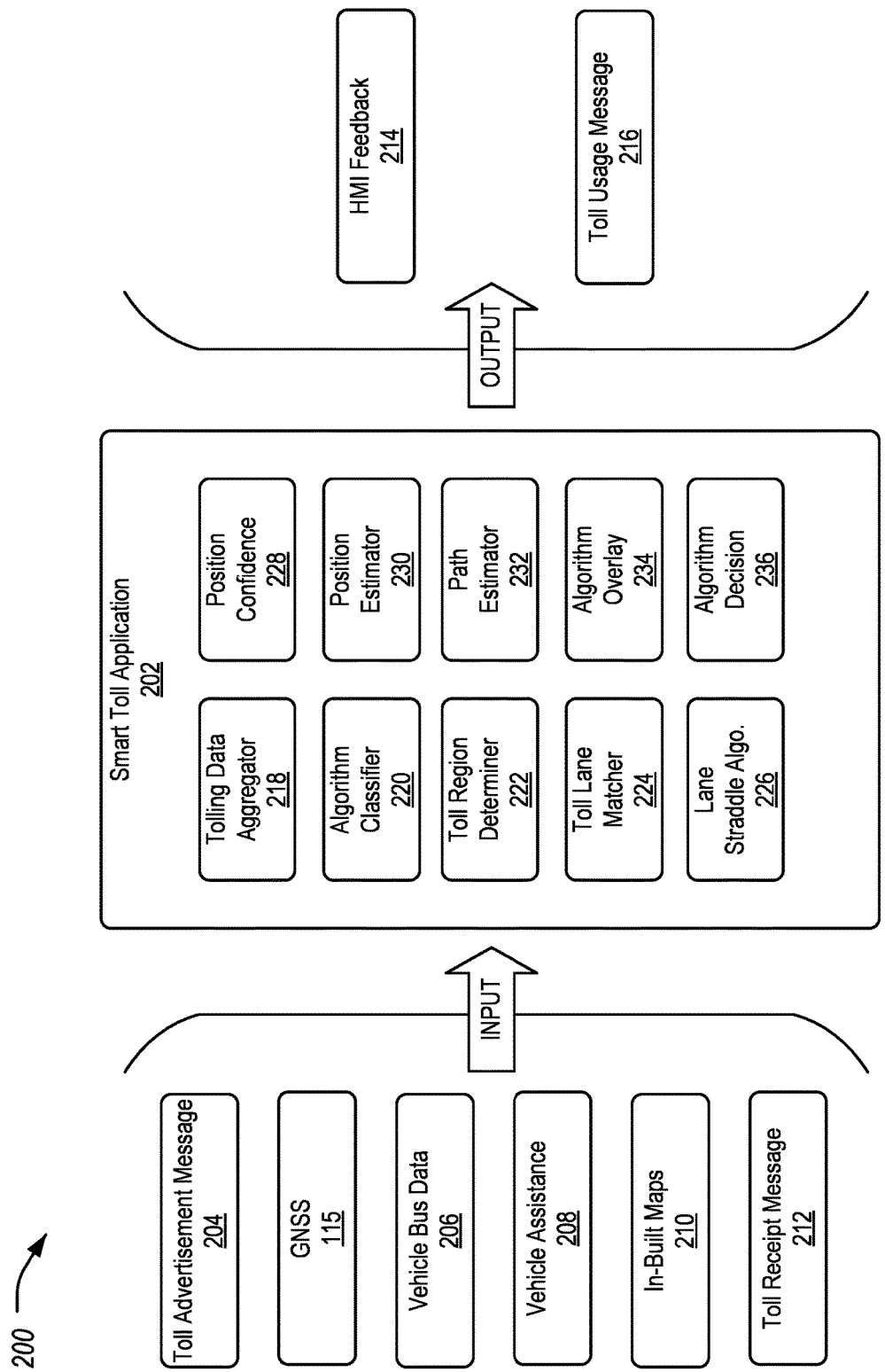
FIG. 2 illustrates aspects of a smart toll application that is executed by the vehicle.

FIG. 2 illustrates aspects of a smart toll application (STA) 202 that is executed by the vehicle 102. The smart toll application 202 may be programmed to allow the vehicle 102 to perform various smart tolling operations discussed in detail herein. In an example, the smart toll application 202 may be executed by one or more processors of the TCU 104.

The smart toll application 202 may receive various elements of data as input. In an example, these inputs may include TAMs 204 (as mentioned above), location information from the GNSS 115 controller, vehicle bus data 206 from a vehicle controller area network (CAN) or other vehicle 102 bus, vehicle assistance 208 information, in-built maps 210 to aid in location of the vehicle 102 along the roadway 110, and TRMs 212 (also as mentioned above).

The smart toll application 202 may provide various outputs as well. In an example, these outputs may include HMI feedback 214 provided to the HMI 114 for use by occupants of the vehicle 102, as well as TUMs 216 for use in charging the vehicle 102 via remote aspects of the tolling system 100 discussed above.

To perform the processing of the inputs into the outputs, the smart toll application 202 may include various components. These may include a tolling data aggregator 218 to process the TAMs 204 and TRMs 212, an algorithm classifier 220, a toll region determiner 222 to determine tolling ranges along the roadway 110, a toll lane matcher 224 to match the vehicle 102 to the tolling ranges, a lane straddle algorithm 226 to determine whether the vehicle 102 is straddling across lanes, a position confidence 228 component to handle GNSS offsets sand other confidence factors, a position estimator 230 to estimate the vehicle 102 position, a path estimator 232 to estimate the vehicle 102 path using the vehicle 102 position, an algorithm overlay 234 to aid in providing the HMI feedback 214, and an algorithm decision 236 component to provide the TUMs 216 and other outputs.

Figure 3:
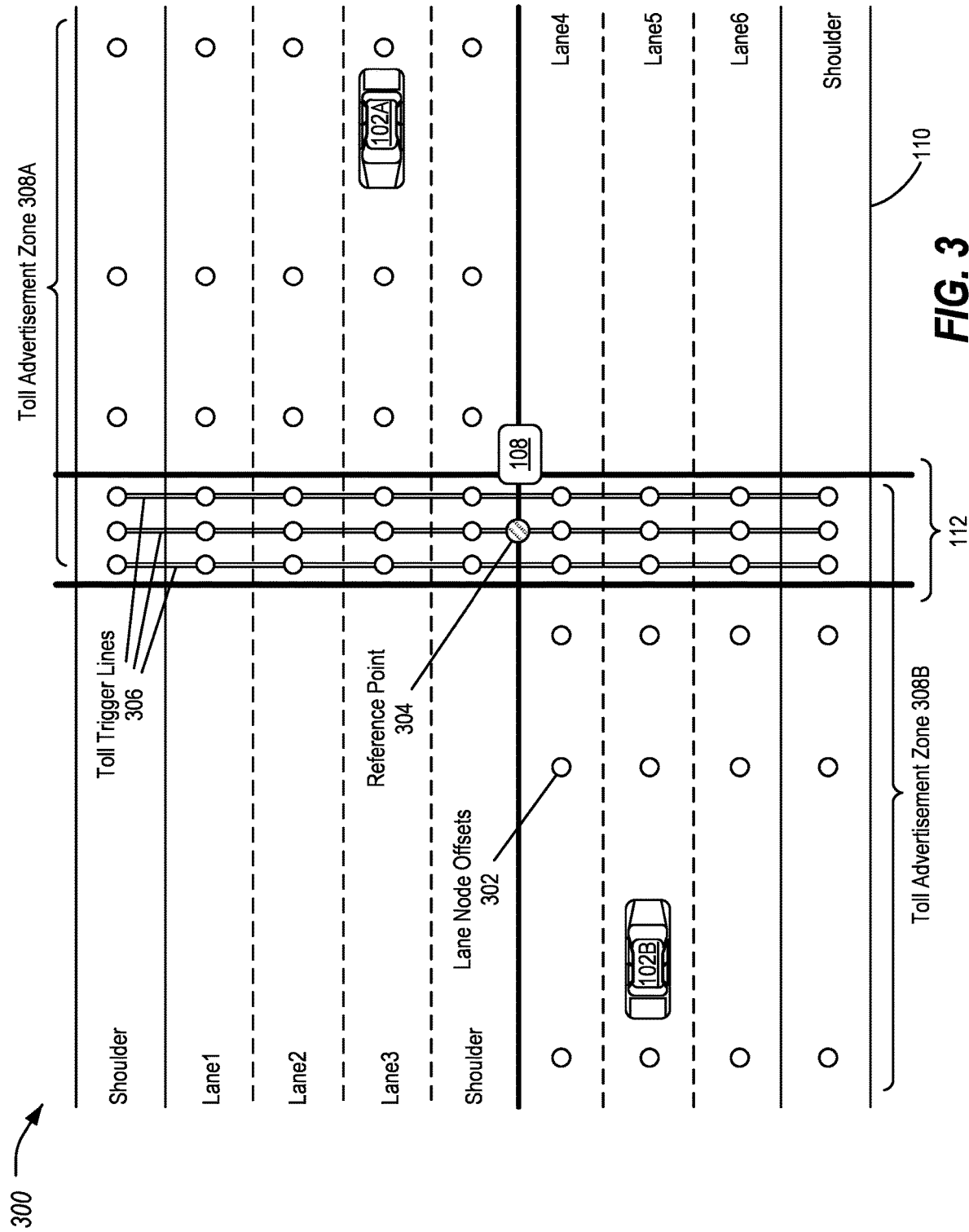
FIG. 3 illustrates an example of a toll road geometry.

FIG. 3 illustrates an example 300 of a toll road geometry. As shown, a gantry 112 extends across lanes of a roadway 110. The lanes of the roadway 110 include, for example, in a first travel direction, a shoulder, a first lane, a second lane, a third lane, and a shoulder. The illustrated roadway 110 further includes a center median, and lanes in a second travel direction, namely, a fourth lane, a fifth lane, a sixth lane, and a shoulder. It should be noted that the particular roadway layout is merely an example. An RSU 108 is in operation in control of the gantry 112.

Lane node offsets 302 are also illustrated in the roadway 110. These lane node offsets 302 indicate geographic locations along the roadway with respect to a reference point 304 indicating the geographic location of the gantry 112. Which lane node offsets 302 to use may depend on the direction of travel of the vehicle 102. For example, the vehicle 102A is traveling in the first travel direction, and therefore may reference its location with respect to the lane node offsets 302 for the lanes in that travel direction (e.g., lanes one through three). These lane node offsets 302 may make up the toll advertisement zone 308A for the first travel direction. The final lane node offsets 302 for each lane may collectively define toll trigger lines 306 at which the vehicle 102 may be configured to pay the toll. As the vehicle 102B is traveling in the second travel direction, it therefore may reference its location with respect to the lane node offsets 302 for the lanes in that second travel direction (e.g., lanes four through six). These lane node offsets 302 may make up the toll advertisement zone 308B for the second travel direction.

Figure 4:
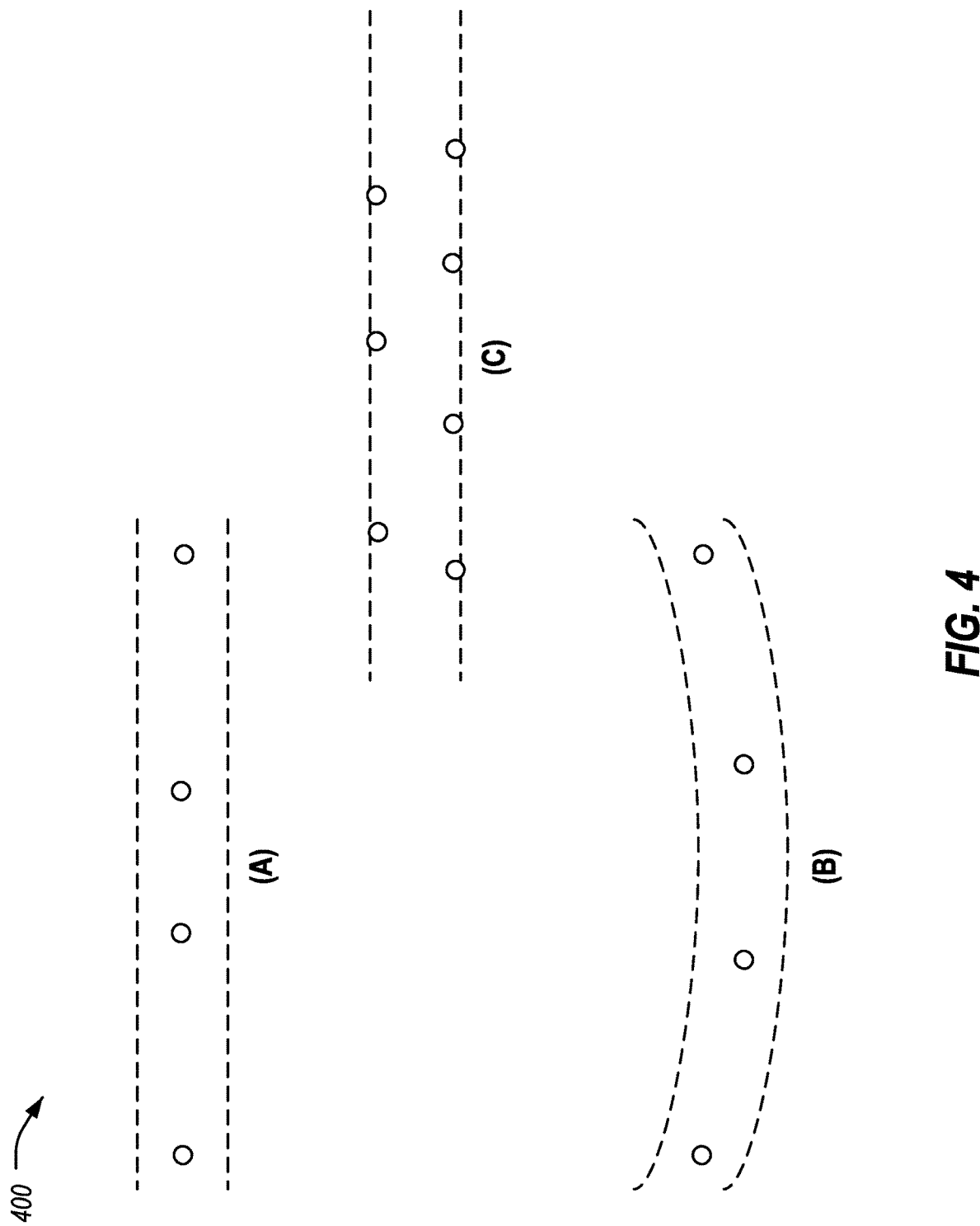
FIG. 4 illustrates an example of different road topologies.

FIG. 4 illustrates an example 400 of different road topologies. A straight road topology is shown at (A), a curved road topology is shown at (B), and a polygon road topology is shown at (C). The straight and curved road topologies may be represented as a series of line node offsets 302 alone the travel path. The polygon road topology may be represented as a set of line node offsets 302 bounding the travel path. Regardless of how the road topology is represented, the information for the offsets may be broadcast by the RSU 108 in the TAM 204.

Figure 5A:
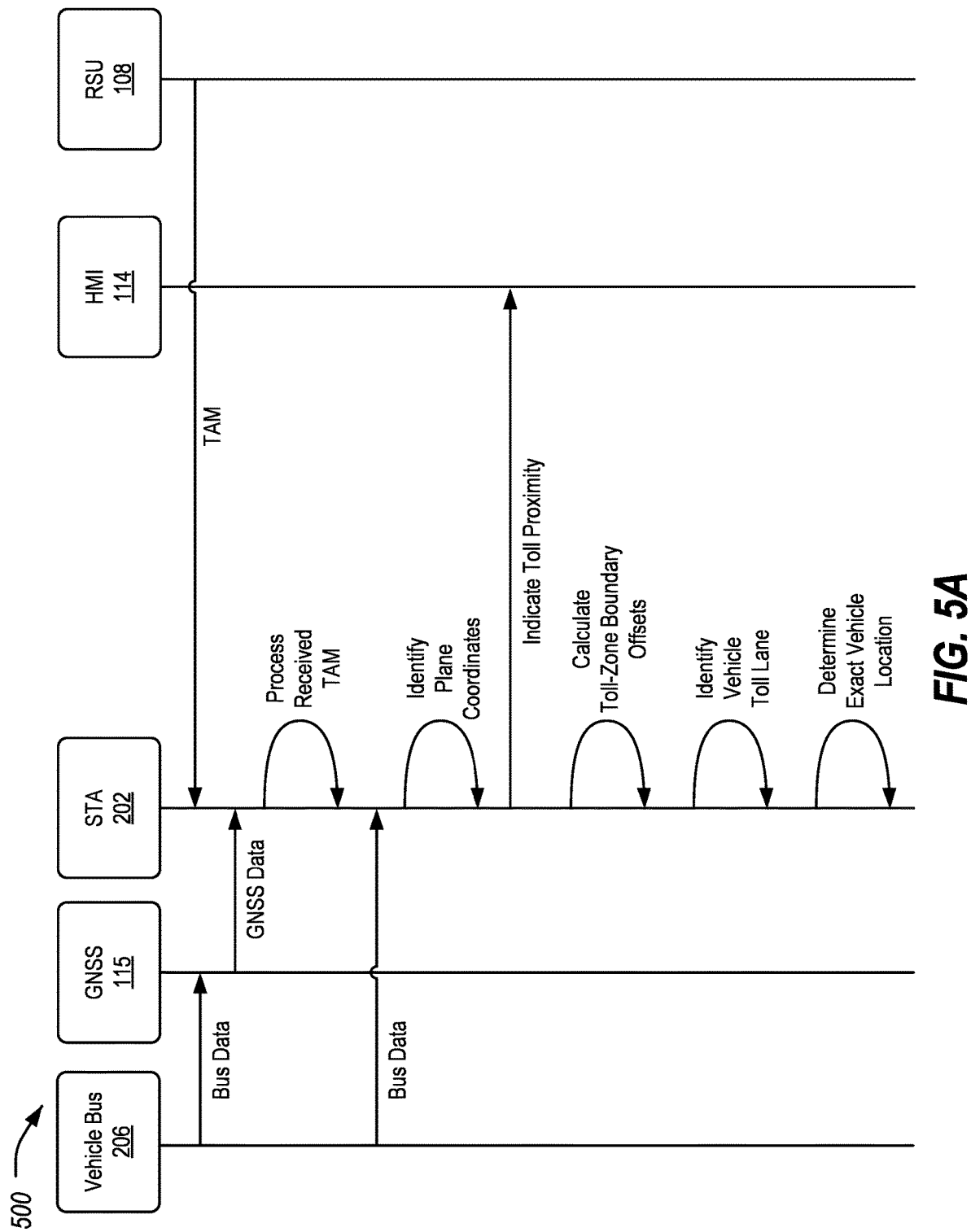
FIGS. 5A, 5B, and 5C collectively illustrate a data flow for performance of V2X tolling transactions.
Figure 5B:
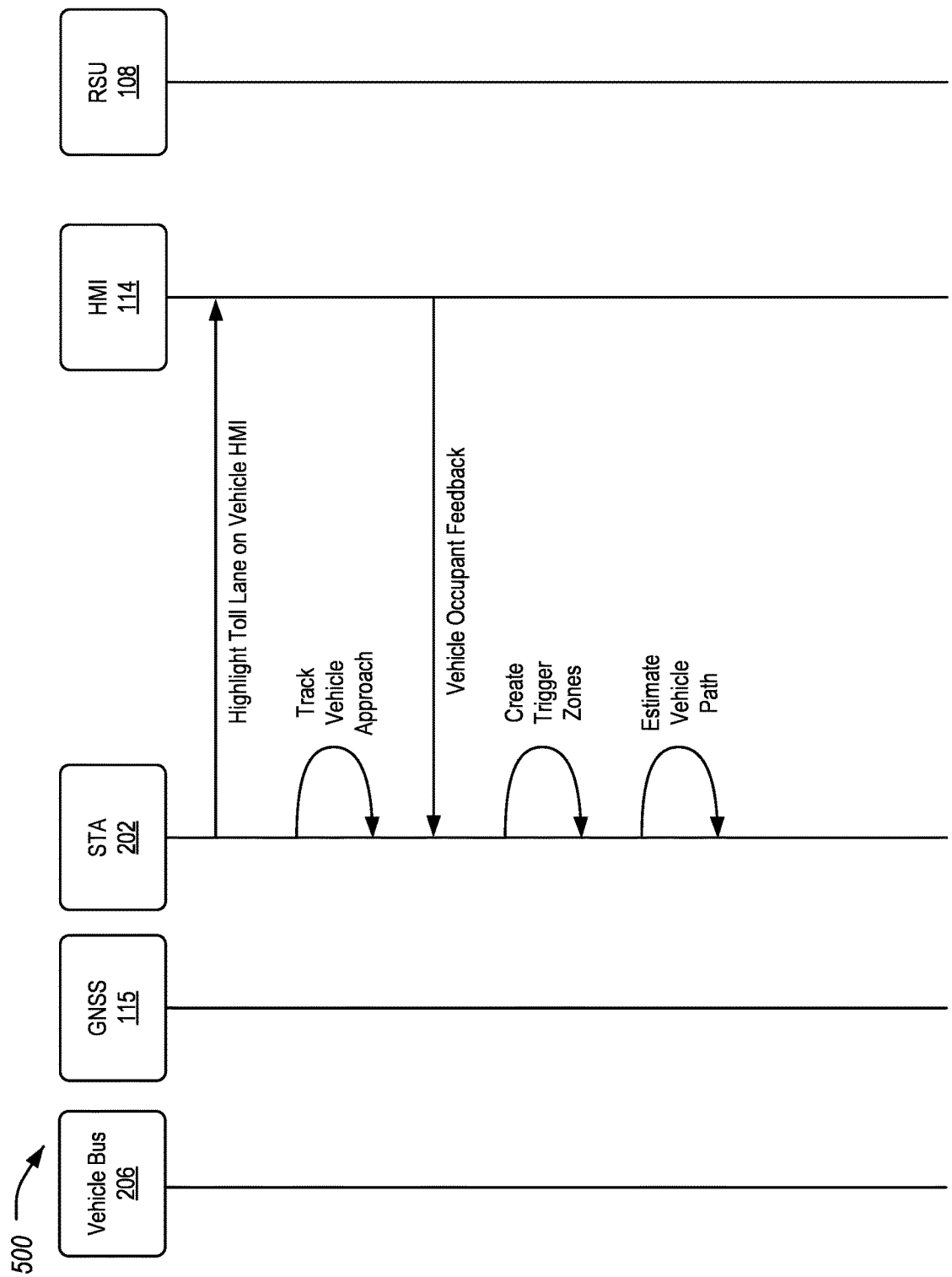
Figure 5C:
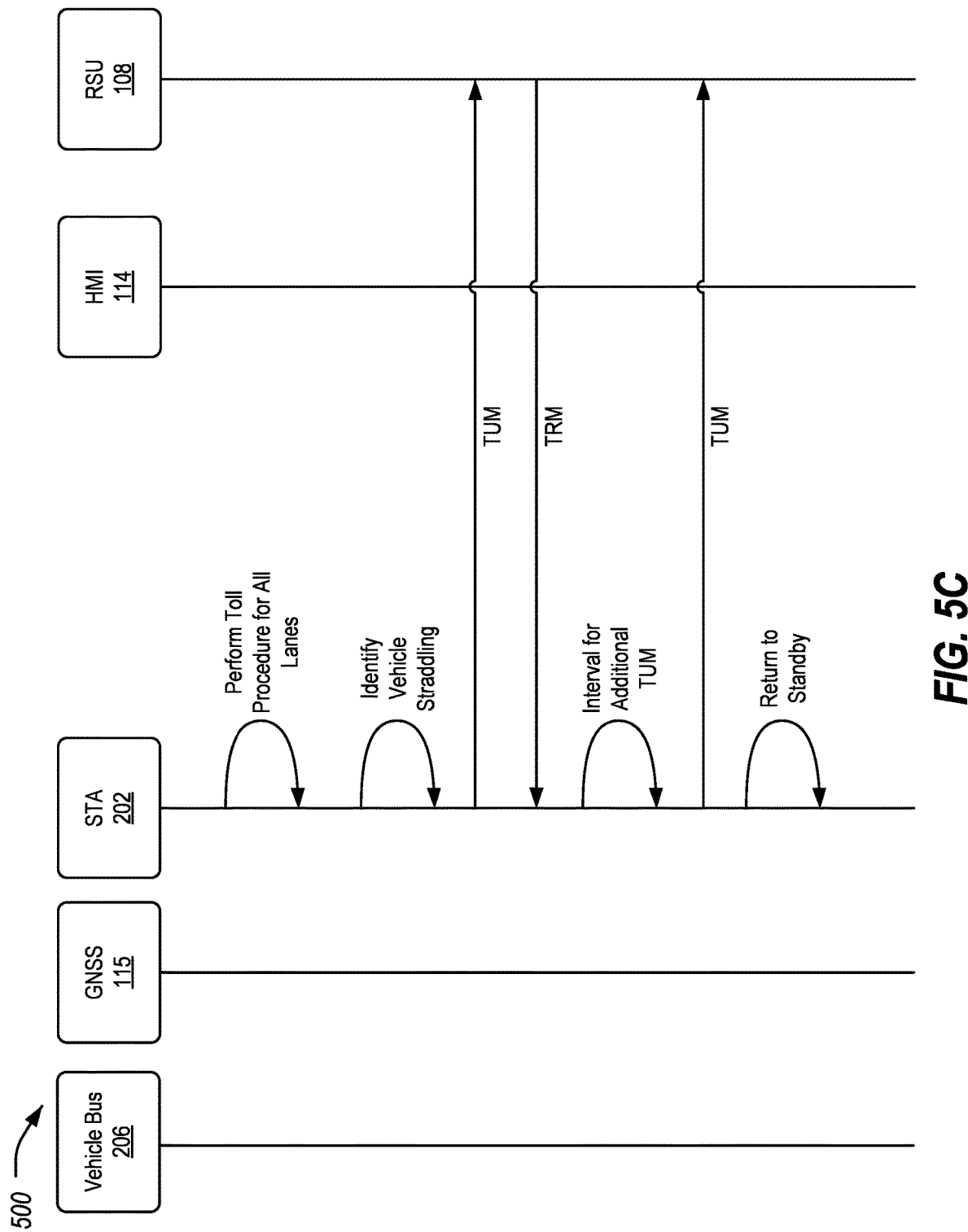

FIGS. 5A, 5B, and 5C collectively illustrate a data flow 500 for performance of V2X tolling transactions. The data flow 500 begins with the vehicle 102 entering into proximity of the gantry 112 and receiving the TAM 204 from the RSU 108. An illustration of such a vehicle 102 is shown in FIG. 6. With continuing reference to FIG. 5A, responsive to receipt of the TAM 204, the vehicle 102 maintains the TAM 204 for further reference.

The vehicle 102 also receives position data from the GNSS 115 controller to identify the position of the vehicle 102, as well as bus data from the vehicle bus 206 to determine vehicle movement direction and/or other vehicle 102 travel characteristics. These inputs are received to the smart toll algorithm 202.

The vehicle 102 may take these inputs including the vehicle positioning data and starts converting the position to common xy-axis plane coordinates from the geodetic coordinates of the data.

The vehicle 102 may alert the driver about a toll zone ahead using the HMI 114. This may be provided in sufficient time based on expected time of arrival (e.g., five minutes ahead, one minute ahead, etc.) or distance ahead (e.g., 1000 feet ahead, 500 feet ahead, etc.). The alert may be provided based on the TAM geodetic coordinates with vehicle's geodetic coordinates, direction-heading, speed, etc.

In addition to the coordinate conversion to a common xy-axis plane of the vehicle 102, the vehicle 102 may calculate virtual toll-zone boundary offsets of the toll lanes along with the TAM lane node offsets and the TAM reference point. This may be done in view of the vehicle 102 heading, to only address points in lanes having the same travel direction as the vehicle 102 and filter out lanes in directions other than the direction of vehicle 102 travel (e.g., the opposite direction lanes of a highway). For instance, this determination of vehicle 102 direction may account for factors such as side slip angle.

As shown in the example 700 of FIG. 7, in addition to determining the virtual toll-zone boundary offsets 702 of the lane of the vehicle 102 based on data in the TAM 204, a virtual toll-zone boundary 704 is created. The virtual toll-zone boundary 704 can be of various shapes for each of the n toll-lanes. This determination may be performed in view of the various types of road geometries shown in FIG. 3.

With continuing reference to FIG. 5A, the algorithm utilizes the vehicle 102 geodetic xy-axis conversions in view of the virtual toll-zone boundary 704 to compute whether the vehicle 102 is within which of the toll zone lanes of the TAM 204 lanes.

In addition to the vehicle 102 determination of in which lane(s) the vehicle 102 is located within the respective virtual toll-zone boundary 704, the vehicle 102 computes where the vehicle 102 is located within the xy-axis plane coordinates according to the GNSS positioning offset of the vehicle 102 GNSS antenna and the dimensions of the vehicle 102. FIG. 8 illustrates an example 800 of continued travel of the vehicle 102 into the virtual toll-zone boundary 704 in view of the lane node offsets 302 and the virtual toll-zone boundary offsets 702. Further aspects of the determination of the virtual toll-zone boundary offsets 702 are discussed with respect to FIG. 15.

Referring more specifically to FIG. 5B, based on the vehicle 102 behavior within the lane, the lane of travel of the vehicle 102 may be highlighted on the HMI 114. For example, this may be provided as an overlay on the HMI 114 screen indicating details of the upcoming toll as identified from the information of the TAM 204 message.

In addition, the vehicle 102 continues to track the location of the vehicle 102 within the virtual toll-zone boundary 704 as the vehicle 102 approaches toe gantry 112. This tracking may involve tracking factors from vehicle bus data such as time, distance, vehicle speed, etc.

If feedback is received from an occupant of the vehicle 102 (e.g., feedback through driving behavior or via the HMI 114) or from the vehicle 102 itself in autonomous situations, the vehicle 102 continues toward the toll trigger line 306 to continue the transaction. An example 900 of a vehicle 102 approach towards the toll trigger line 306 is shown in FIG. 9.

As shown in FIGS. 10 and 11, the vehicle 102 may, with respect to the toll trigger line 306 for the TUM 216, create a virtual trigger zone 1002. The toll may be charged responsive to the vehicle 102 being within the virtual trigger zone 1002. As shown in the example 1000 of FIG. 10, the virtual trigger zone 1002 may be triangular. As shown in the example 1100 of FIG. 11, the virtual trigger zone 1002 may be rectangular. The specific shape of the virtual trigger zone 1002 may be of any polygonal shape and may depend on the shape of the TAM 204 toll zones.

With continuing reference to FIG. 5B, the vehicle 102 may also estimate the path of the vehicle 102 within the virtual toll-zone boundary 704, referencing the lane node offsets 302 where useful for estimation of the vehicle 102 behavior. The vehicle 102 may further publish the TUM 216 over the air to send to be received by the RSU 108 for communication to the toll charger 116.

With reference to FIG. 5C, the aforementioned procedure discussed with respect to FIGS. 5A and 5B may be simultaneously performed for all travel lanes in the toll advertisement zone 308 to account for all lanes of travel of the roadway 110. Moreover, it should be noted that there may be instances in which the vehicle 102 straddles more than one lane of the roadway 110. Thus, the vehicle 102 makes this determination as well.

As shown in FIG. 5C, for lane straddling, the vehicle 102 utilizes a lane straddling algorithm 226 (discussed in further detail with respect in FIG. 12) to account for vehicle 102 dimensions (e.g., length and width), vehicle GNSS positioning with antenna offsets, boundary offsets of the lanes etc. in determining whether straddling of lanes occurs. The vehicle 102 triggers a TUM 216 broadcast from the vehicle 102 to be provided to the RSU 108. The TUM 216 may indicate the vehicle's respective percentage within each lane in the transmission.

The vehicle 102 may in some cases initiate another TUM 216 at predefined intervals until the vehicle 102 has not received a TRM 212 within various criteria such as within a predefined time period. After completion of receipt of the TUM 216 and transmission of the TRM 212 at the gantry 112, the vehicle 102 may return to a standby state until receipt of another TAM 204 message awakes the STA 202.

Figure 12:
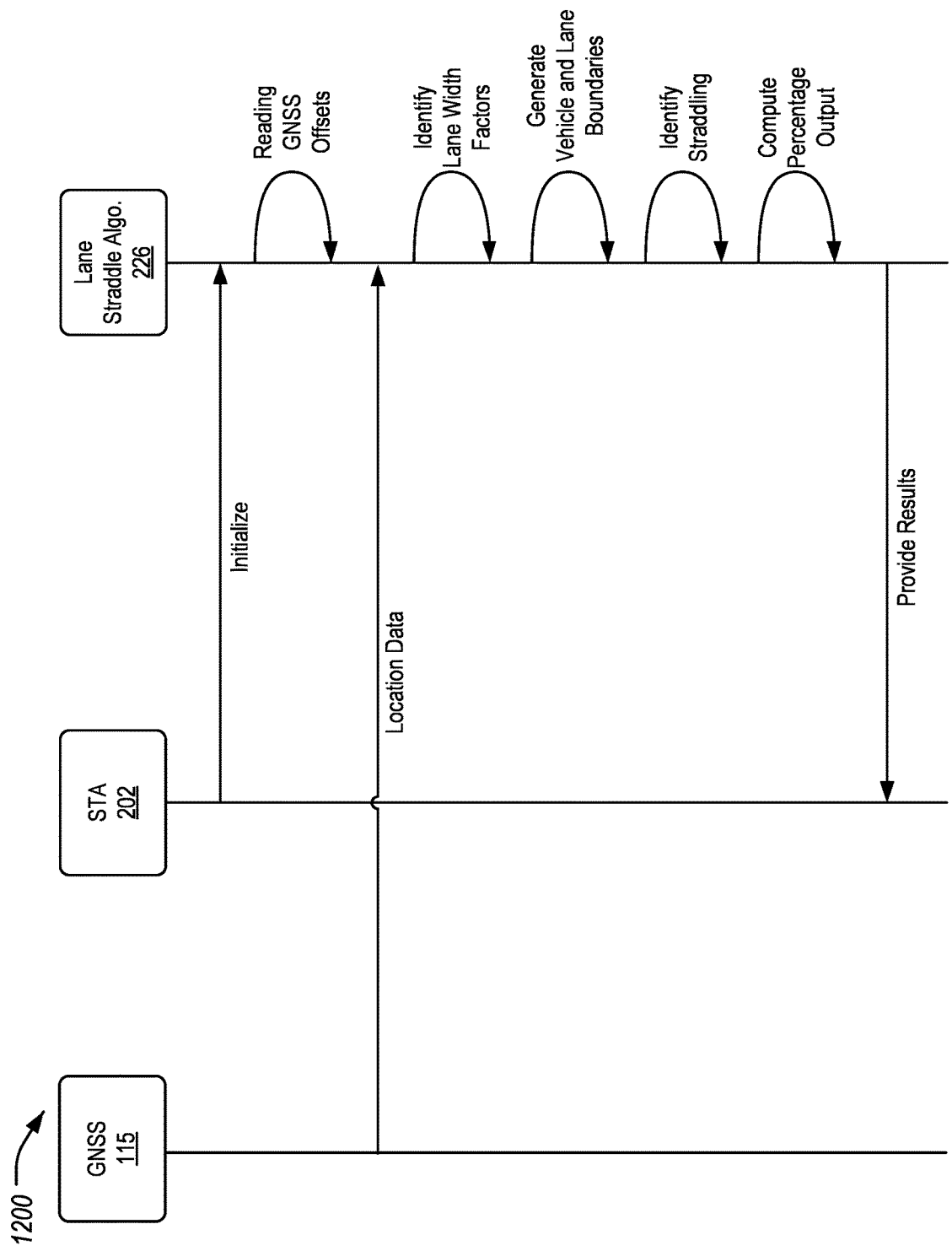
FIG. 12 illustrates an example data flow for determination of vehicle lane straddling.

FIG. 12 illustrates an example data flow 1200 for determination of vehicle 102 lane straddling. As shown, the lane straddle algorithm 226 may be initialized as shown in FIG. 5C and may read GNSS antenna offsets. The GNSS antenna offsets may be specific to the vehicle 102 transceiver (and/or received from RSU 108 with respect to the location of the gantry 112) and used to allow the lane straddle algorithm 226 to better locate the vehicle 102 with respect to the gantry 112 reference point 304.

The lane straddle algorithm 226 may further receive GNSS data indicative of the location of the vehicle 102. Using this location, the generated virtual toll-zone boundaries 704, and the lane width factors, the vehicle 102 may generate vehicle 102 left and right boundaries using the vehicle position and the vehicle 102 width to generate a virtual vehicle bounding box. This may include determining vehicle straddling virtual boundaries for the left side of the vehicle 102 and vehicle straddling virtual boundaries for the right side of the vehicle 102. These vehicle boundaries may be cross checked with the lane boundaries to determine whether lane straddling is occurring. The result of this determination may include computation of a percentage output that the vehicle 102 is in each lane of the roadway 110. This output may be provided to the STA 202, e.g., for inclusion in the TUM 216.

FIG. 13 illustrates an example 1300 of a vehicle 102 straddling two lanes. As shown, the vehicle 102 is straddling lanes one and two. In such an example, the data flow 1200 may determine that the vehicle 102 is 50% in lane1 and 50% in lane2.

FIG. 14 illustrates an example 1400 of various measurements for the determination of the vehicle 102 straddling. As shown, the GNSS data locates the vehicle 102 at the GNSS location 1402 in accordance with GNSS offsets calibrated specific to the transceiver of the vehicle 102. Moreover, the vehicle 102 width is known. The vehicle width divided by two is then used to determine the vehicle left and right margins. These can then be compared against the lane margins. Similar determination may be done using a known vehicle 102 length.

Figure 15:
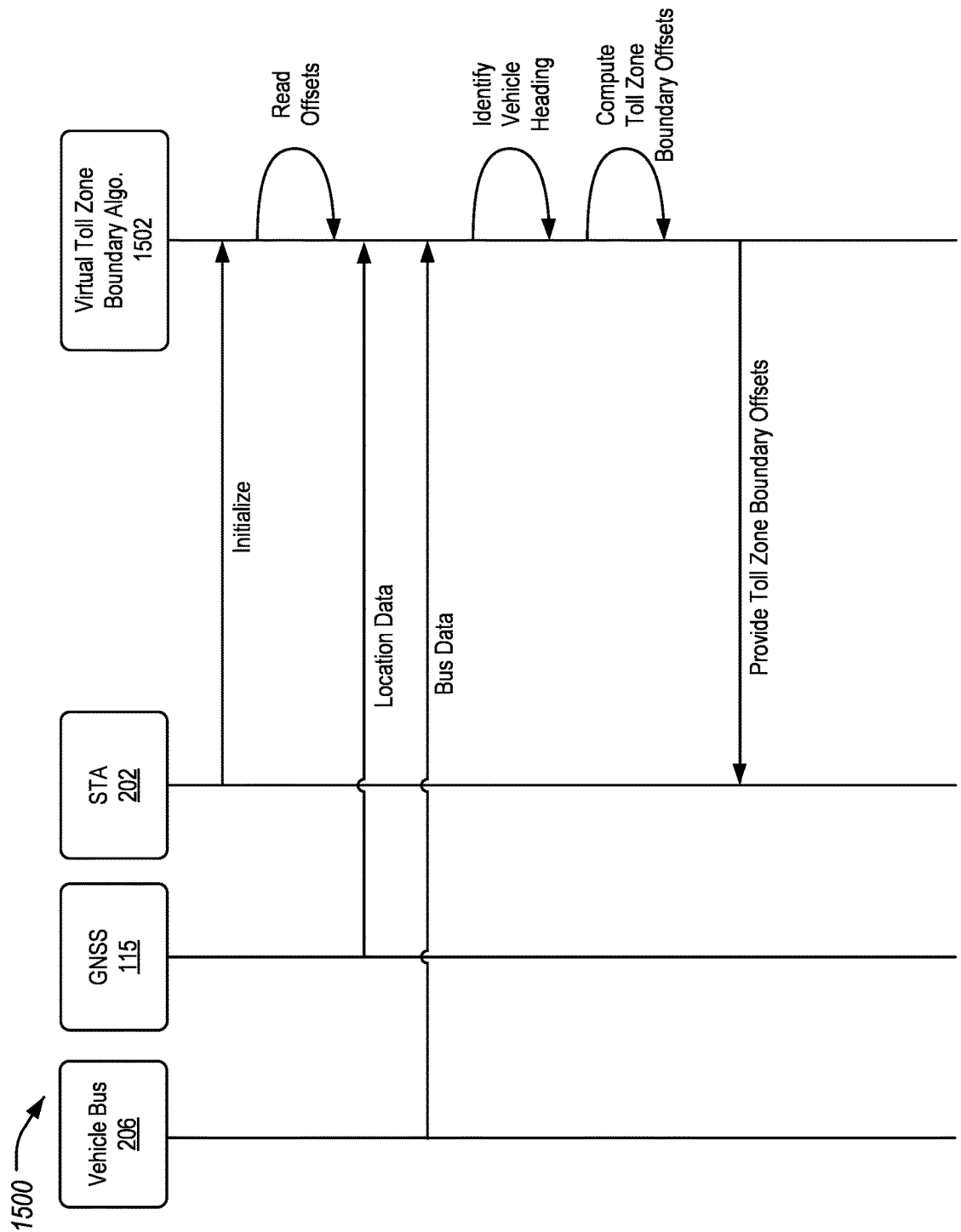
FIG. 15 illustrates an example data flow for determination of the virtual toll-zone boundary offsets.

FIG. 15 illustrates an example data flow 1500 for determination of the virtual toll-zone boundary offsets 702. As shown, the virtual toll zone boundary algorithm 1502 may be initialized as shown in FIG. 5A and may read GNSS antenna offsets. The virtual toll zone boundary algorithm 1502 may further receive location data from the GNSS 115 controller and bus data, each as mentioned above. The virtual toll zone boundary algorithm 1502 may also access data from the TAM 204.

Figure 16:
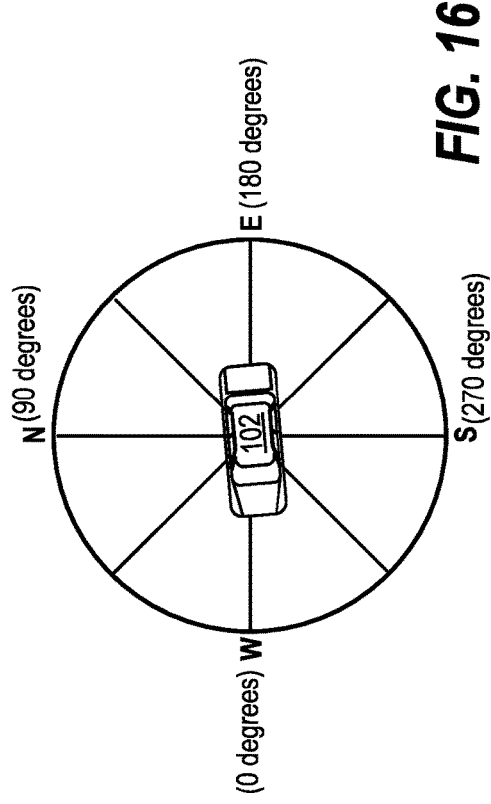
FIG. 16 illustrates an example of determination of vehicle heading angle with respect to the travel direction of the vehicle.

Using the information, the virtual toll zone boundary algorithm 1502 identifies the heading of the vehicle 102. To perform the virtual toll-zone boundary offsets calculation, information with respect to the vehicle heading is received via the bus data. The heading may be computed in relative angle coordinates to North (or another reference angle) in the same xy-coordinate system used with respect to the reference point 304 of the toll gantry 112. FIG. 16 illustrates an example 1600 of determination of vehicle 102 heading angle with respect to the travel direction of the vehicle 102.

Figure 17:
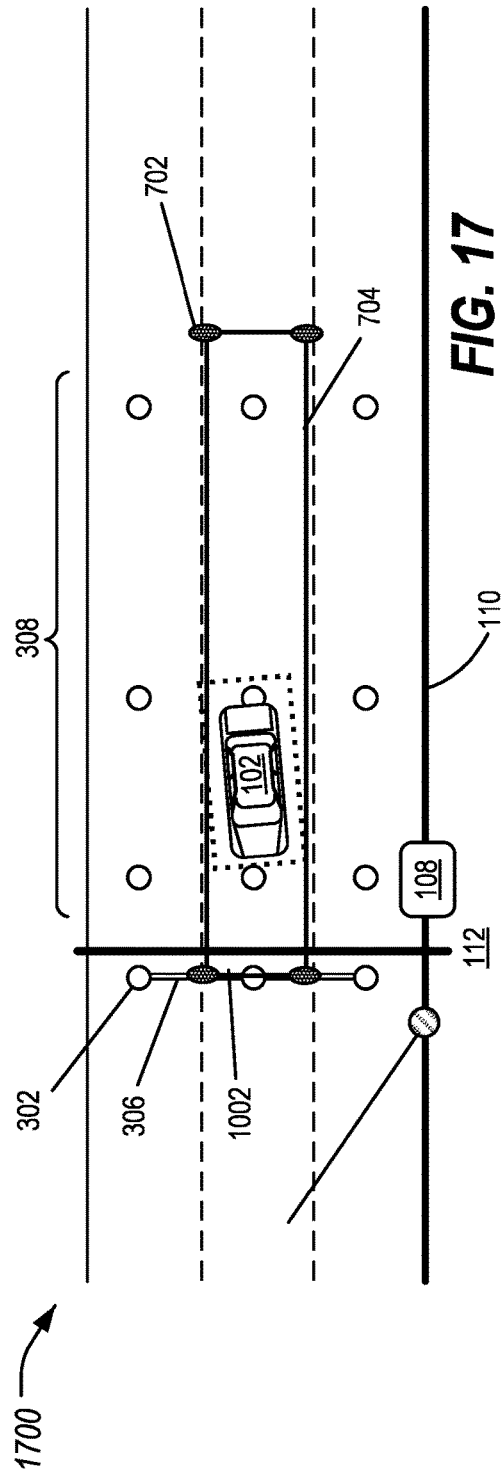
FIG. 17 illustrates an example of the vehicle bounding box in view of the toll zone.

Based on the heading, the virtual toll zone boundary algorithm 1502 computes the virtual toll-zone boundary offsets 702. These virtual toll-zone boundary offsets 702 are provided by the virtual toll zone boundary algorithm 1502 to the STA 202. FIG. 17 illustrates an example 1700 of the vehicle 102 bounding box in view of the toll zone.

Variations on the described systems and methods are possible. In an example, for instances when only a portion of the vehicles 102 have V2X connectivity, those vehicles 102 that do have connectivity could perform the sending of TUM messages for those vehicles 102 that lack connectivity. In another example, vehicles 102 that have V2X connectivity may be unable to reliably communicate with the RSU 108 for various reasons, such as data congestion, atmospheric conditions, line-of-sight obstructions, etc. In such instances, vehicles 102 with good connectivity to the RSU 108 may operate as relays between the further vehicles 102.

In yet a further example, if a platoon of vehicles 102 is performing tolling operations with an RSU 108, then a platoon leader may be configured to perform the tolling messaging for the platoon of vehicles 102 as a whole. This may improve system efficiency and reduce network traffic with the RSU 108.

Figure 18:
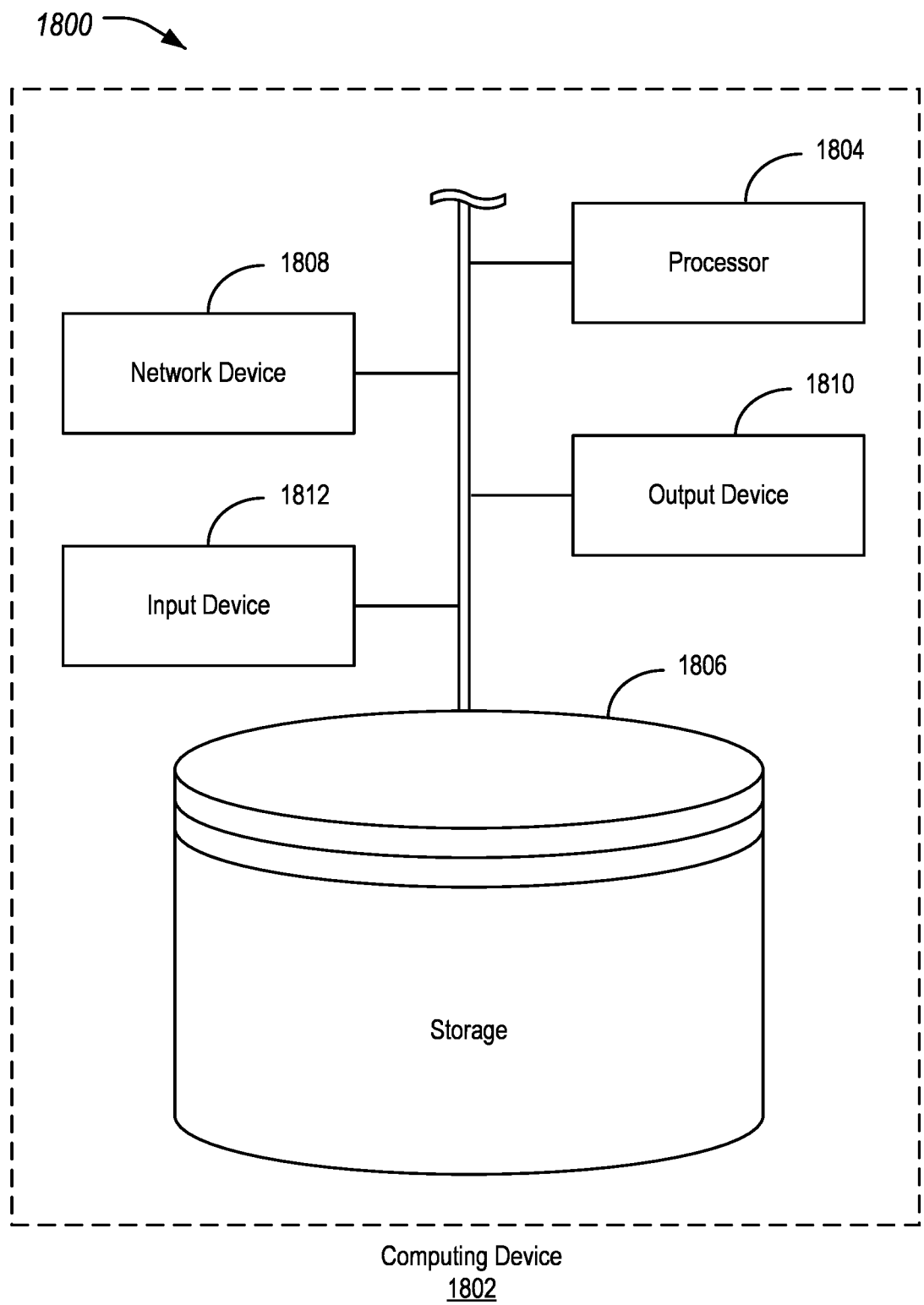
FIG. 18 illustrates an example of a computing device for use in the performance of V2X tolling transactions.

FIG. 18 illustrates an example 1800 of a computing device 1802 for use in the performance of V2X tolling transactions. Referring to FIG. 18, and with reference to FIGS. 1-17, the TCU 104, RSU 108, toll charger 116, toll pay center 118, and customer account system 122 may be examples of such computing devices 1802. As shown, the computing device 1802 may include a processor 1804 that is operatively connected to a storage 1806, a network device 1808, an output device 1810, and an input device 1812. It should be noted that this is merely an example, and computing devices 1802 with more, fewer, or different components may be used.

The processor 1804 may include one or more integrated circuits that implement the functionality of a central processing unit (CPU) and/or graphics processing unit (GPU). In some examples, the processors 1804 are a system on a chip (SoC) that integrates the functionality of the CPU and GPU. The SoC may optionally include other components such as, for example, the storage 1806 and the network device 1808 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 1804 executes stored program instructions that are retrieved from the storage 1806. The stored program instructions, accordingly, include software that controls the operation of the processors 1804 to perform the operations described herein. The storage 1806 may include both non-volatile memory and volatile memory devices. The non-volatile memory includes solid-state memories, such as NAND flash memory, magnetic and optical storage media, or any other suitable data storage device that retains data when the system is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 1810. The output device 1810 may include a graphical or visual display device, such as an electronic display screen, projector, printer, or any other suitable device that reproduces a graphical display. As another example, the output device 1810 may include an audio device, such as a loudspeaker or headphone. As yet a further example, the output device 1810 may include a tactile device, such as a mechanically raiseable device that may, in an example, be configured to display braille or another physical output that may be touched to provide information to a user.

The input device 1812 may include any of various devices that enable the computing device 1802 to receive control input from users. Examples of suitable input devices that receive human interface inputs may include keyboards, mice, trackballs, touchscreens, voice input devices, graphics tablets, and the like.

The network devices 1808 may each include any of various devices that enable the TCU 104, RSU 108, toll charger 116, toll pay center 118, toll agency hub 120, and customer account system 122 to send and/or receive data from external devices over networks (such as the communications network 106). Examples of suitable network devices 1808 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle for smart tolling, comprising:
a telematics control unit configured to provide vehicle-to-everything (V2X) communication; and
a processor, programmed to
receive a toll advertisement message (TAM) broadcast from a roadside unit (RSU) via V2X communication, the TAM indicating geographic locations of lanes of a roadway for which tolls are due and cost information for traversing the lanes of the roadway,
determine a heading of the vehicle in relation to a TAM reference point indicating a geographic location of a toll gantry,
identify a toll zone boundary region for the vehicle by filtering the geographic locations of the lanes in the TAM to include only those lanes in a travel direction consistent with the heading,
utilize a lane straddling algorithm to identify, for each of the lanes in the travel direction, a respective percentage within each lane that the vehicle is traveling, and
send a tolling usage message (TUM) via the V2X communication, the TUM indicating, to the RSU, the percentage lane usage of the vehicle.

2. The vehicle of claim 1, wherein the TUM further includes one or more of a position of the vehicle, a speed of the vehicle, a heading of the vehicle, a charge status of the vehicle, an identifier of the vehicle, a number of passengers of the vehicle, dimensions of the vehicle, license plate details of the vehicle, or license plate details of a trailer of the vehicle.

3. The vehicle of claim 1, wherein the processor is further programmed to indicate, to a user interface of the vehicle, the location of the vehicle along the roadway illustrating the respective percentage within each lane that the vehicle is traveling.

4. The vehicle of claim 1, wherein the processor is further programmed to:
utilize global navigation satellite system (GNSS) data from a GNSS controller of the vehicle to locate a center of the vehicle at a location in accordance with GNSS offsets calibrated specific to a GNSS receiver of the telematics control unit of the vehicle;
determine vehicle margins as a bounding box of vehicle length and vehicle width centered around the center of the vehicle; and
utilize the bounding box to determine the respective percentage within each lane that the vehicle is traveling.

5. The vehicle of claim 1, wherein the TAM specifies lane node offsets that indicate geographic locations along the roadway with respect to the reference point, and the processor is further programmed to filter the geographic locations of the lanes by utilizing the specified geographic locations of the lanes along the roadway.

6. The vehicle of claim 5, wherein the lane node offsets indicate the geographic location along the roadway of the lanes as a series of geographic points indicating a travel path within the respective lane.

7. The vehicle of claim 5, wherein the lane node offsets indicate the geographic location along the roadway of the lanes as a polygon of geographic points bounding a travel path within the respective lane.

8. The vehicle of claim 1, wherein the processor is further programmed to compute the heading as a reference angle in an xy-coordinate system defined by the reference point of the toll gantry.

9. The vehicle of claim 1, wherein the processor is further programmed to:
define, based on the TAM, a virtual trigger zone within which the vehicle is to send the TUM; and
send the TUM to the RSU responsive to the vehicle being located within the virtual trigger zone.

10. The vehicle of claim 9, wherein the processor is further programmed to:
estimate a travel path of the vehicle to identify where the vehicle will enter the virtual trigger zone in advance of entry of the vehicle being located within the virtual trigger zone; and
send an estimated TUM responsive from the vehicle being estimated as being along the travel path to enter the virtual trigger zone.

11. The vehicle of claim 9, wherein the virtual trigger zone is a rectangular zone covering a lane of the roadway.

12. The vehicle of claim 9, wherein the virtual trigger zone is a triangular zone extending from a lane node offset of a lane of the roadway to boundaries of the lane.

13. The vehicle of claim 9, wherein the processor is further programmed to write the TUM to a blockchain record as a smart contract to automatically create an unalterable record of a toll transaction indicated by the TUM.

14. The vehicle of claim 13, wherein the RSU is configured to maintain a transaction database of TUM information broadcast by the vehicle to maintain the unalterable record of the toll transaction.

15. The vehicle of claim 1, wherein the vehicle is a platoon leader of a plurality of platoon vehicles, and the vehicle is further configured to send TUM messages for each of the plurality of platoon vehicles.

16. A method for smart tolling comprising:
receiving, by a vehicle, a toll advertisement message (TAM) broadcast from a roadside unit (RSU) via V2X communication, the TAM indicating geographic locations of lanes of a roadway for which tolls are due and cost information for traversing the lanes of the roadway;
determining a heading of the vehicle in relation to a TAM reference point indicating a geographic location of a toll gantry;
identifying a toll zone boundary region for the vehicle by filtering the geographic locations of the lanes in the TAM to include only those lanes in a travel direction consistent with the heading;
utilizing a lane straddling algorithm to identify, for each of the lanes in the travel direction, a respective percentage within each lane that the vehicle is traveling; and
sending a tolling usage message (TUM) via the V2X communication, the TUM indicating, to the RSU, the percentage lane usage of the vehicle.

17. The method of claim 16, further comprising indicating, to a user interface of the vehicle, the location of the vehicle along the roadway illustrating the respective percentage within each lane that the vehicle is traveling.

18. The method of claim 16, further comprising:
utilize global navigation satellite system (GNSS) data from a GNSS controller of the vehicle to locate a center of the vehicle at a location in accordance with GNSS offsets calibrated specific to a GNSS receiver of a telematics control unit of the vehicle;
determine vehicle margins as a bounding box of vehicle length and vehicle width centered around the center of the vehicle; and
utilize the bounding box to determine the respective percentage within each lane that the vehicle is traveling.

19. The method of claim 16, wherein the TAM specifies lane node offsets that indicate geographic locations along the roadway with respect to the reference point, and further comprising filtering the geographic locations of the lanes by utilizing the specified geographic locations of the lanes along the roadway.

20. The method of claim 19, wherein the lane node offsets indicate the geographic location along the roadway of the lanes as a series of geographic points indicating a travel path within the respective lane.

21. The method of claim 19, wherein the lane node offsets indicate the geographic location along the roadway of the lanes as a polygon of geographic points bounding a travel path within the respective lane.

22. The method of claim 16, further comprising computing the heading as a reference angle in an xy-coordinate system defined by the reference point of the toll gantry.

23. The method of claim 16, further comprising:
defining, based on the TAM, a virtual trigger zone within which the vehicle is to send the TUM; and
sending, to the RSU, the TUM responsive from the vehicle being located within the virtual trigger zone.

24. The method of claim 23, further comprising:
estimating a travel path of the vehicle to identify where the vehicle will enter the virtual trigger zone in advance of entry of the vehicle being located within the virtual trigger zone; and
sending an estimated TUM responsive from the vehicle being estimated as being along the travel path to enter the virtual trigger zone.

25. The method of claim 23, wherein the virtual trigger zone is a rectangular zone covering a lane of the roadway.

26. The method of claim 23, wherein the virtual trigger zone is a triangular zone extending from a lane node offset of a lane of the roadway to boundaries of the lane.

27. The method of claim 23, further comprising writing the TUM to a blockchain record as a smart contract to automatically create an unalterable record of a toll transaction indicated by the TUM.

28. The method of claim 27, further comprising storing, by the RSU, a transaction database of TUM information broadcast by the vehicle to maintain the unalterable record of the toll transaction.

* * * * *